(12) United States Patent
Archer

(10) Patent No.: US 6,273,377 B1
(45) Date of Patent: Aug. 14, 2001

(54) DEVICE FOR FIXING ANTENNA

(75) Inventor: Bernard Archer, Linas (FR)

(73) Assignee: Lucent Technologies Inc., Murray Hill, DE (US)

(*) Notice: Subject to any disclaimer, the term of this patent is extended or adjusted under 35 U.S.C. 154(b) by 0 days.

(21) Appl. No.: 09/320,619

(22) Filed: May 26, 1999

(30) Foreign Application Priority Data

May 29, 1998 (EP) .................................................. 98460018

(51) Int. Cl.[7] ........................................................ A47F 5/00
(52) U.S. Cl. ...................... 248/218.4; 248/300; 411/400
(58) Field of Search ............................ 248/218.4, 219.1, 248/219.3, 219.4, 300, 211, 220.21, 225.21; 343/888; 411/400

(56) References Cited

U.S. PATENT DOCUMENTS

| | | | |
|---|---|---|---|
| 2,675,982 | * 4/1954 | Budy | 248/211 |
| 3,880,090 | * 4/1975 | Duclos | 400/411 |
| 4,079,487 | * 3/1978 | Coop, Sr. | 400/411 |
| 4,957,251 | * 9/1990 | Hubbard | 248/300 X |
| 5,215,281 | * 6/1993 | Sherman | 248/300 X |

* cited by examiner

Primary Examiner—Ramon O. Ramirez

(57) ABSTRACT

A support device for anchoring an antenna on a pylon rafter. The device includes an anchoring base to be applied to the outside of a first wing of an angle bar rafter. The anchoring base having a first hooking element for engaging the edge of the wing. The device has at least one shank hook for hooking to the edge of the second wing of the rafter. Each shank passing into a hole of the anchoring base and receiving at an extremity a tightening nut. The device also includes an interposition element provided to come under the nut and consisting of a rounded profile segment as regards its portion in contact against the anchoring base. This allows a variable slanting of the shank hook so as to obtain an anchoring also effective on different profile rafters.

13 Claims, 2 Drawing Sheets

DEVICE FOR FIXING ANTENNA

CROSS-REFERENCE TO RELATED APPLICATION

This application claims priority of European Patent Applications No. 98460018.9, which was filed on May 29, 1998.

TECHNICAL FIELD

The present invention concerns the fixing of "aerial" equipment and more particularly the fixing of antenna.

BACKGROUND OF THE INVENTION

Pylons, or other basic supports intended to receive antenna, have sectional steel sections either integrated or built into their structure. Antennas, or their poles, are anchored to the sectional steel sections with the aid of an intermediate support element. These sectional steel sections are commonly known in the trade as "rafters", and will be referred to herein as rafters.

Rafters have different types of sections that vary in shape and dimension. For the most part, the sections are round bar sections or angle bar sections. The angle bar sections may have a right or closed or open angle. Corresponding to each of the section shapes is a particular shape of intermediate support element.

A problem with this is that in his daily work, an operator laying antenna is required to always have a complete range of intermediate support elements available on site in order to be able to use the one that corresponds to the type of rafter used.

SUMMARY OF THE INVENTION

In order to solve this problem, the invention offers a single intermediate support device able to be used on a plurality of rafters with different sections whilst ensuring effective and reliable anchoring. According to the invention, this intermediate support device anchors an equipment item, such as an antenna, on an angle bar rafter. The intermediate support device includes an anchoring portion for fixing the equipment integral with an anchoring portion of the rafter. The anchoring portion includes an anchoring base to be applied to the outside of a first wing of the rafter. The anchoring base has a first element at one end of the anchoring base. The first element hooks onto the free edge of the first wing of the rafter. Optionally, the first element may consist of an end return of the base forming with it an acute rectilinear angle. The anchoring portion also includes at least one shank hook that hooks onto the free edge of a second wing of the rafter. Each shank hook passes into a hole of the anchoring base at a distance from the first element. In one embodiment of the invention, the holes can be elongated slits orientated in a direction corresponding to a transverse direction of the rafter, and, for each shank hook, the anchoring base can have a set of these slits aligned in a direction corresponding to the transverse direction of the rafter. Each shank hook has its end portion threaded so as to receive a tightening nut. An interposition element is located between the tightening nut and the anchoring base to ensure an adequate bearing of the nut on the base. The portion of the interposition element intended to come into contact with the anchoring base can be a rounded profile segment, allowing a variable slanting of the shank hook transversally with respect to the rafter. This allows an effective anchoring on any one of a plurality of angle bar rafters regardless of their rectilinear angle and the dimensions of their section. Optionally, two shank hooks may be provided and may be spaced from each other in a direction corresponding to the length of the rafter. The interposition element can then be a small bar common to the two shank hooks. The anchoring base may also have stiffening returns on two opposing sides. The direction of the stiffening returns corresponds to the transverse direction of the rafter.

In an alternative embodiment of the invention, U-shaped fastening elements can be used instead of shank hooks. The U-shaped fastening elements traverse the anchoring base via their extremities to allow anchoring on round section rafters. The passage holes in the anchoring base provided for the extremities of the fastening elements are advantageously the same holes that are used for the passage of the shank hooks.

BRIEF DESCRIPTION OF THE DRAWINGS

These characteristics and advantages of the invention shall appear more clearly from a reading of the following description and attached drawings on which.

In all the drawings, the same references have been used to denote throughout the document the same elements.

DETAILED DESCRIPTION

Figure 1:
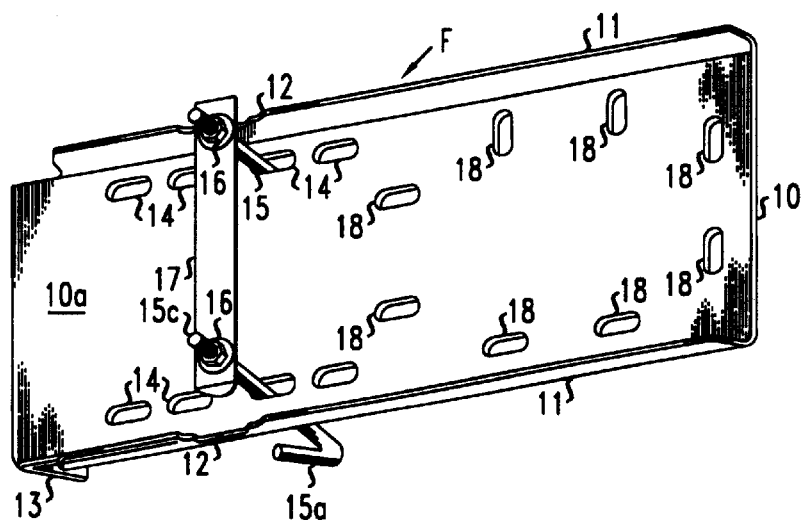
FIG. 1 is a view of an intermediate support device of the invention.
Figure 4:
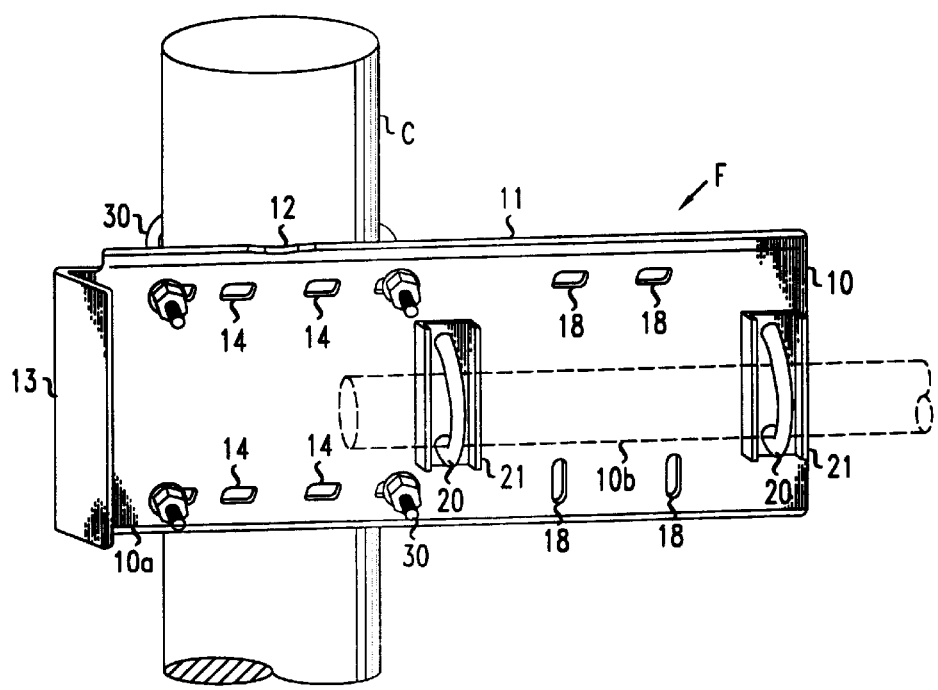
FIG. 4 is a perspective view of the device of FIG. 1 mounted on a rafter with a circular section.

FIG. 1 illustrates a fixing device or intermediate support device F of the invention that is able to be anchored with a given effectiveness to angle bars with various sections that vary with respect to the dimensions of their wings and their rectilinear angle. With reference to FIG. 4, it shall be subsequently seen that this device can be anchored on a round section rafter with two additional fasteners.

Intermediate support device F includes plate 10 which is a rectangular metallic plate having longitudinally a first zone or anchoring base 10a extended by a second zone 10b used to fix an antenna, generally by means of a mast. In the embodiment shown, there is no continuity solution between the zones 10a, 10b, but this could be possible in the same way as the two zones could be two separate elements rendered integral.

On its two large sides, plate 10 has stiffening returns 11 that have opposite scallopings 12, preferably cut into steps. Scallopings 12 are in the median portion of anchoring base 10a. Stiffening returns 11 are orientated transversally with respect to a rafter, but subsequently the terms "transversally" and "longitudinally", if not stated otherwise, are to be considered relatively to the plate 10.

On its free side, anchoring base 10a includes a fold or return 13 formed with anchoring base 10a at an acute rectilinear angle. Return 13 is orientated opposite stiffening returns 11. Return 13 is used for hooking onto the free edge of a first wing of the angle bar rafter.

Anchoring base 10a further includes two rows of longitudinally elongated slits distributed on each side of scallopings 12, close and parallel to stiffening returns 11. Slits 14 in the two rows are two-by-two transversally opposite one another.

Figure 2:
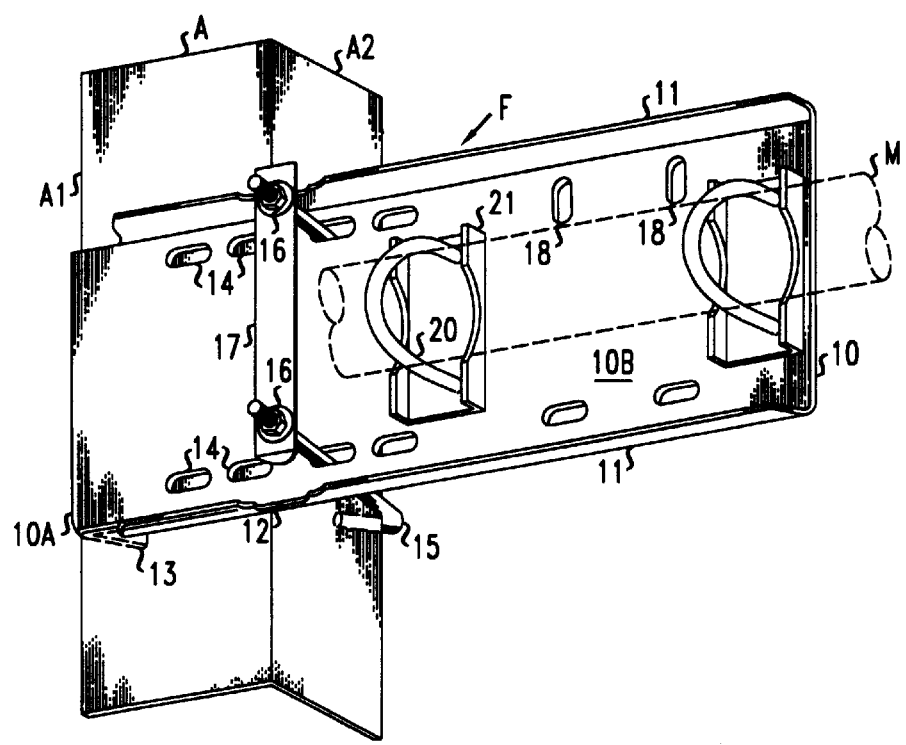
FIG. 2 is a perspective view of the device of FIG. 1 mounted on standard angle bar rafter having a rectilinear angle of 90°.
Figure 3:
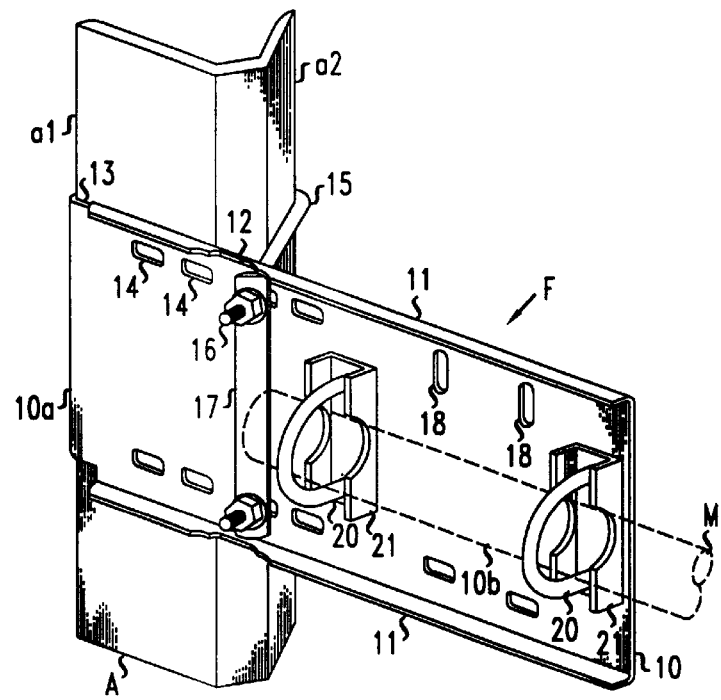
FIG. 3 is a perspective view of the device of FIG. 1 mounted on standard angle bar rafter having a rectilinear angle of 60°.

Second zone 10b also includes oblong slits 18 similar to slits 14 and intended for fixing antenna mast M, as shown on FIGS. 2 to 4. Slits 18 are divided into two identical groups of four slits offset from one another by 90° so as to enable the antenna mast to be orientated horizontally or vertically. Each group of slits comprises two distant pairs of slits 18 opposite one another. One group of slits being aligned transversally and the other longitudinally. The orientation of slits 18 in a given group being offset by 90° from one pair to the other so as to permit a fine adjustment of the orientation of mast M, which is fixed with the aid of U-shaped fasteners 20 and interposition cradles 21.

In addition to plate 10, device F includes a device to cooperate with the latter by hooking onto the free edge of the second angle bar wing of a rafter and by ensuring locking of the unit. This device includes two shanks 15 forming a hook via an end portion 15a bent into a pin. The other end portion 15c of shanks 15 is situated beyond an intermediate rectilinear portion 15b. End portion 15c is threaded so as to receive nut 16 after end portion 15 is passes through slit 14 of anchorage base 10a, and through interposition element 17. Interposition element is intended to ensure a correct bearing between nuts 16 and the wall of anchorage base 10a. To this effect, interposition element 17 is a small bar having a rounded section in its portion coming opposite anchorage base 10a. The two shank hooks 15 are passed into slits 14 opposite one another, and through the half-round small bar that is the interposition element 17. Interposition element 17 is common to the two shank hooks 15 and fully covers the entire width of plate 10.

FIG. 2 represents intermediate support device F anchored on rafter A of right angle bar (rectilinear angle of 90°). On mounting, anchoring base 10a is applied to wing a1 with extremity return 13 passed onto the free edge thereof. End portions 15a of shank hooks 15 anchor to the free edge of wing a2. End portions 15c are passed into the two most suitable slits 14 opposite one another, namely those for which the angle between the intermediate shank portion 15b and the anchoring base 10a is be the closest, namely less than 90°. During tightening with the nuts 16, the interposition element 17 shall also ensure an effective bearing support on the wall of plate 10, whether shank hook 15 is fully orthogonal to plate 10 or is in a slanting position. Most frequently the free edges of the angle bar wings are internally cut into a bevel so as to improve significantly the catching of the hooks 13 and 15.

FIG. 3 shows the same device F anchored onto rafter A of closed angle bar (acute rectilinear angle of about 60°). Anchoring is effected at any point in the same way as in the preceding example. The shanks of shank hooks 15 are here slanted on anchoring base 10a by an angle equal at the most to 60° without the effectiveness of the bearing support of interposition element 17 or accordingly without the solidity of fixing being diminished. The same quality of anchoring would be obtained on a rafter of open angle bar (rectilinear angle of more than 90°).

FIG. 4 shows the same device F anchored on rafter C with a circular section. To this effect, intermediate support device F comprises two U-shaped fasteners 30 conforming to the diameter of the rafter. On mounting, plate 10 is applied to the rafter so that the rafter is engaged in the scallopings 12, then the U-shaped fasteners 30 are put in place. The extremities of each U-shaped fastener 30 pass into slits 14 of a given longitudinal row and receive tightening nuts. It is to be noted that the cut into steps of the scallopings 12 provide excellent stability on fixing.

I claim:

1. A support device for anchoring an item of equipment, such as an antenna, on an angle bar rafter comprising:
   an anchoring base having:
      an extremity return that forms an acute rectilinear angle with the anchoring base at one extremity of the anchoring base, the extremity return for hooking onto an edge of a first wing of the rafter; and
      at least one first hole at a distance from the extremity return;
   at least one shank hook for hooking onto an edge of a second wing of the rafter, each shank passing through one of the at least one first holes and having its extremity portion threaded to receive a tightening nut;
   the first hole having a diameter larger than the diameter of the shank hook; and
   an interposition element positioned between the tightening nut and the anchoring base for ensuring an adequate bearing of the tightening nut on the anchoring base, the interposition element being a segment with a rounded section as regards its portion that comes into contact with the anchoring base.

2. The device according to claim 1, wherein the first hole is an elongated slit oriented in a direction corresponding to a transverse direction of the rafter.

3. The device according to claim 2, wherein there is a set of first holes in the anchoring base, each set of first holes being aligned in a direction corresponding to the transverse direction of the rafter.

4. The device according to claim 1, wherein the at least one shank hook comprises two shank hooks spaced from each other in a direction corresponding to a length of the rafter.

5. The device according to claim 4, wherein the interposition element is a small bar common to the two shank hooks.

6. The device according to claim 1, further comprising at least one U-shaped fastening element for traversing the anchoring base via its extremities to allow anchoring on round section rafters.

7. The device according to claim 6, wherein the at least one U-shaped fastening element comprises two U-shaped fastining elements.

8. The device according to claim 6, wherein there are at least two first holes for each U-shaped fastening element, and extremities of the U-shaped fasteners pass through the first holes.

9. The device according to claim 8,
   wherein the extremities of each U-shaped fastener are threaded to receive a tightening nut; and
   further comprising an interposition element having two opening, each having one extremity of one of the U-shaped fastening elements passing through it, the interposition element positioned between the tightening nut and the anchoring base for ensuring an adequate bearing of the tightening nut on the anchoring base.

10. The device according to claim 1, wherein the anchoring base comprises stiffening returns on two opposing sides whose direction corresponds approximately to a transverse direction of the rafter.

11. The device according to claim 10, wherein the returns comprise scallopings opposite one another, the scallopings located in the median portion of the anchoring base.

12. The device according to claim 11, wherein the scallopings are cut into steps.

13. The device according to claim 1, wherein the anchoring base is a first zone on a plate extended by a second zone.

* * * * *